United States Patent [19]

Hayashi et al.

[11] Patent Number: 5,098,118
[45] Date of Patent: Mar. 24, 1992

[54] VEHICLE SUSPENSION SYSTEM FOR STEERABLE WHEELS

[75] Inventors: Toshio Hayashi; Toshiro Kondo; Fumitaka Ando, all of Hiroshima, Japan

[73] Assignee: Mazda Motor Corporation, Japan

[21] Appl. No.: 546,151

[22] Filed: Jun. 28, 1990

[30] Foreign Application Priority Data

Jun. 28, 1989 [JP] Japan .................. 1-75888[U]
Dec. 27, 1989 [JP] Japan .................. 1-341935

[51] Int. Cl.⁵ .................. B60G 3/06; B60G 7/02
[52] U.S. Cl. .................. 280/691; 280/673
[58] Field of Search .............. 280/91, 690, 691, 695, 280/701, 673

[56] References Cited

U.S. PATENT DOCUMENTS

| | | | |
|---|---|---|---|
| 4,327,927 | 5/1982 | Tanaka | 280/691 |
| 4,714,270 | 12/1987 | Rumpel | 280/690 |
| 4,732,407 | 3/1988 | Oyama | 280/673 |
| 4,832,364 | 5/1989 | Kikuchi | 280/701 |

FOREIGN PATENT DOCUMENTS 58-139807  8/1983  Japan .................. 280/701
64-49404   3/1989  Japan .

Primary Examiner—Charles A. Marmor
Assistant Examiner—Karin Tyson
Attorney, Agent, or Firm—Thompson, Hine and Flory

[57] ABSTRACT

A rear end portion of a triangular arm member and a vehicle body side member are interconnected by an assisting link member extending in the widthwise direction of the vehicle body so as to allow the movement of a rear end portion of the triangular arm member in the longitudinal direction of the vehicle body but to restrict the movement thereof in the transverse direction of the vehicle body. Accordingly, the rear end portion of the triangular arm member undergoes displacement in parallel to the longitudinal direction of the vehicle body without rotating in the transverse direction of the vehicle body.

11 Claims, 7 Drawing Sheets

VEHICLE SUSPENSION SYSTEM FOR STEERABLE WHEELS

BACKGROUND OF THE INVENTION

1. Field of the Invention

This invention relates to an improvement in a vehicle suspension system for steerable wheels.

2. Description of the Prior Art

A conventional vehicle suspension system for steerable wheels, provided with the following construction, has been generally known in the art. In a conventional vehicle suspension system, a wheel side portion and a vehicle body side portion of a motor vehicle are interconnected by a suspension arm. This same suspension arm, thus, supports the wheel swingably in the vertical direction to the vehicle body. (For example, refer to U.S. Pat. No. 4,448,441.)

As shown in FIG. 9, in this type of a vehicle suspension system, an outboard end of a suspension arm 85 is interconnected, through a ball joint 86, with a steering knuckle 84 which rotatably supports a wheel 82, while an inboard end of the suspension arm 85 is supported at a vehicle body side member 87 by two supporting portions which are longitudinally spaced apart at a fixed interval by means of a front rubber bushing 91 located substantially sideways from the steering knuckle 84 (the center of the wheel 82) and also a rear rubber bushing 92 located in the rear. One of the rubber bushings 91, 92 provided at the two supporting portions arranged in the front and rear, usually the front rubber bushing 91 located sideways from the steering knuckle 84, is made of relatively hard rubber. In other words, rigidity of the rubber bushing 91 is set higher. This is to obtain transverse rigidity of a steering device 81. On the other hand, the rear rubber bushing 92 which is diagonally spaced away from the steering knuckle 84 is made of relatively soft rubber. Thus, rigidity of the rubber bushing 92 is set lower in order to obtain the longitudinal compliance. With these arrangements, vehicle running stability and comfortableness to ride has been improved.

However, the disadvantages arise in this conventional suspension device 81 when force in the longitudinal direction acts on the wheel 82, for example, in the case where the vehicle runs over a projection on a road surface. More specifically, as shown in the broken line of FIG. 9, when force F proceeding from the front to the rear of the vehicle body acts on the wheel 82, a displacement of the rear supporting portion of the suspension arm 85 occurs not only in the rearward direction, but also in the inboard direction of the vehicle body. This is because rigidity of the rear rubber bushing 92 is set lower than the front rubber bushing 91. As a result, whole portion of the suspension arm 85 slightly rotates toward the rear with the front supporting portion as an axis. In this way, a displacement in the transverse direction also occurs in the rear end portion of the suspension arm 85 or in the rear rubber bushing 92.

To control the suspension arm 85 properly in response to the longitudinal force acting on the wheel 82, it is necessary to obtain desirable displacement characteristic in the transverse direction of the rear rubber bushing 92. Generally, torsional deformation of the rear rubber bushing 92 occurs along with the swing motion of the suspension arm 85 which is caused by the vertical displacement of the wheel 82. At the same time, the longitudinal displacement of the rear rubber bushing 92 (along with the longitudinal movement of the suspension arm 85) is needed. In this way, the rear rubber bush 92 must meet these complicated deformation requirement. Accordingly, it is rather difficult to achieve the desirable transverse displacement characteristic for the rear rubber bushing 92.

The desirable characteristics of the transverse displacement for this rear rubber bushing 92 are as follows.

(1) As mentioned earlier, when the longitudinal force acts on the wheel 82 while the vehicle is running on a rough road surface or running at high speed, the suspension arm 85 swings on the front supporting portion (the rubber bushing 91) as an axis. This leads to the swing motion of the steering knuckle 84. Accordingly, a displacement in the widthwise direction of the vehicle body occurs in a tie rod 89 which is connected with the rear end of the steering knuckle 84. In this case, the widthwise displacement of the tie rod 89 results in the generation of force to rotate a steering wheel, thus causing the so-called shimmy phenomenon. This shimmy phenomenon has a negative effect on the steering stability of the vehicle. Thus, the transverse rigidity of the rear rubber bushing 92 should desirably be increased in order to restrict this shimmy phenomenon.

(2) When the wheel runs over a projection on a road surface, the rear rubber bushing 92 is required to have extensively low transverse rigidity with softness itself. This is to ease the shock imposed on the vehicle body effectively. Meanwhile, in the region where the rubber bushing undergoes the substantial displacement in the transverse direction due to force with heavy load, the rear rubber bushing 92 is required to have high rigidity with hardness itself in order to restrict further displacement. Therefore, as for the characteristic of the rubber bushing 92 against external force when the vehicle is running on to a projection on a road, a non-linear type characteristic in accordance with the shock imposed on the vehicle body is desirable.

As mentioned above, wide variety of characteristics is required for the rear rubber bushing 92 as to the transverse elastic displacement thereof. However, it is extremely difficult to satisfy the above-mentioned transverse displacement characteristics when it comes to a rear rubber bushing which is subject simultaneously to the rotational and torsional deformation, and the longitudinal displacement.

SUMMARY OF THE INVENTION

The objects of the present invention are: (1) to provide a suspension system having a favorable control performance against the longitudinal force acting upon a wheel; (2) to provide a suspension system which can restrain the shimmy phenomenon while obtaining the sufficient longitudinal compliance; and (3) to provide a suspension system which can effectively improve riding comfort when, for example, when the vehicle runs over a projection on a road surface.

Means to solve the aforementioned problems are provided in this invention with the purpose of attaining the above objects. First, the definition must be made for a vehicle suspension system in this invention. A vehicle suspension system for steerable wheels, when referred to here in this invention, comprises: a triangular arm member wherein an outboard end thereof is interconnected with a wheel support member rotatably supporting a steerable wheel, and an inboard end thereof is supported at a vehicle body side member by means of two pivotally mounting members longitudinally spaced apart at a fixed interval; wherein a front pivotally mounting member located in the front of the vehicle body out of the two pivotally mounting members is arranged substantially sideways from the wheel support member, while a rear pivotally mounting member located in the rear of the vehicle body is made of a rubber bushing which is displaceable at least in the transverse direction of the vehicle body; and wherein said triangular arm member supports the wheel swingably in the vertical direction. The improved vehicle suspension system for a steerable wheel further comprises an assisting link member extending substantially in the transverse direction of the vehicle body and having rotatable pivotally mounting means on both ends thereof, wherein pivotally mounting means on one end thereof is interconnected with a rear end portion of the triangular arm member, and pivotally mounting means on the other end thereof is interconnected with the vehicle body side member. This assisting link member interconnects the rear end portion of the triangular arm member and the vehicle body side member so as to allow the movement of the rear end portion of the triangular arm member in the longitudinal direction of the vehicle body, but to restrict the movement thereof in the transverse direction of the vehicle body.

In this way, the rear end portion of the triangular arm member and the vehicle body side member are interconnected by the assisting link member extending in the widthwise direction of the vehicle body so as not to restrict the longitudinal movement but to restrict the transverse movement. Thus, with the above construction in the invention, sufficient transverse rigidity as well as the longitudinal compliance in the rear end portion of the triangular arm member can be obtained. Thus, an occurrence of the widthwise displacement due to the rotation of the triangular arm member in the case of the generation of longitudinal load upon the wheel can be effectively prevented, thereby restricting the shimmy phenomenon. Further, favorable control performance can be achieved.

The rear end portion of the triangular arm member is free from the restriction in its longitudinal movement. Accordingly, when the longitudinal force acts on the wheel while the vehicle is running on a rough road surface, the rear end portion of the triangular arm member rotates in the longitudinal direction of the vehicle body on pivotally mounting means of the vehicle body side member of the assisting link member as an axis. Thus, comfortableness to ride while the vehicle is running on a rough road surface can be effectively improved.

These objects and novel features of the invention will become more apparent from the following detailed description with reference to the accompanying drawings.

BRIEF DESCRIPTION OF THE DRAWINGS

The accompanying drawings illustrate the preferred embodiments of this invention. FIGS. 1 through 3 particularly illustrate the embodiments of the present invention, in which:

FIG. 1 is a plane explanatory drawing showing a right side portion of a front suspension system;

FIG. 2 is a sectional view taken along the line II—II in FIG. 1;

FIG. 3 is a sectional view taken along the line III—III in FIG. 1.

FIGS. 4 through 8 illustrate an alternate example of the invention, in which:

FIG. 4 is a plan view showing a right side portion of a front suspension system;

FIG. 5 is a rear elevation showing the right side portion of the front suspension system viewed from the rear of the vehicle body;

FIG. 6 is a perspective view showing the right side portion of the front suspension system viewed from the upper front thereof;

FIG. 7 is a sectional view showing a vehicle body side supporting portion of an assisting link; and FIG. 8 is a characteristic diagram showing characteristic of an elastic bushing against external force from the front.

DETAILED DESCRIPTION OF THE INVENTION

Each preferred embodiment of the invention will be now described with reference to the accompanying drawings.

Figure 1:
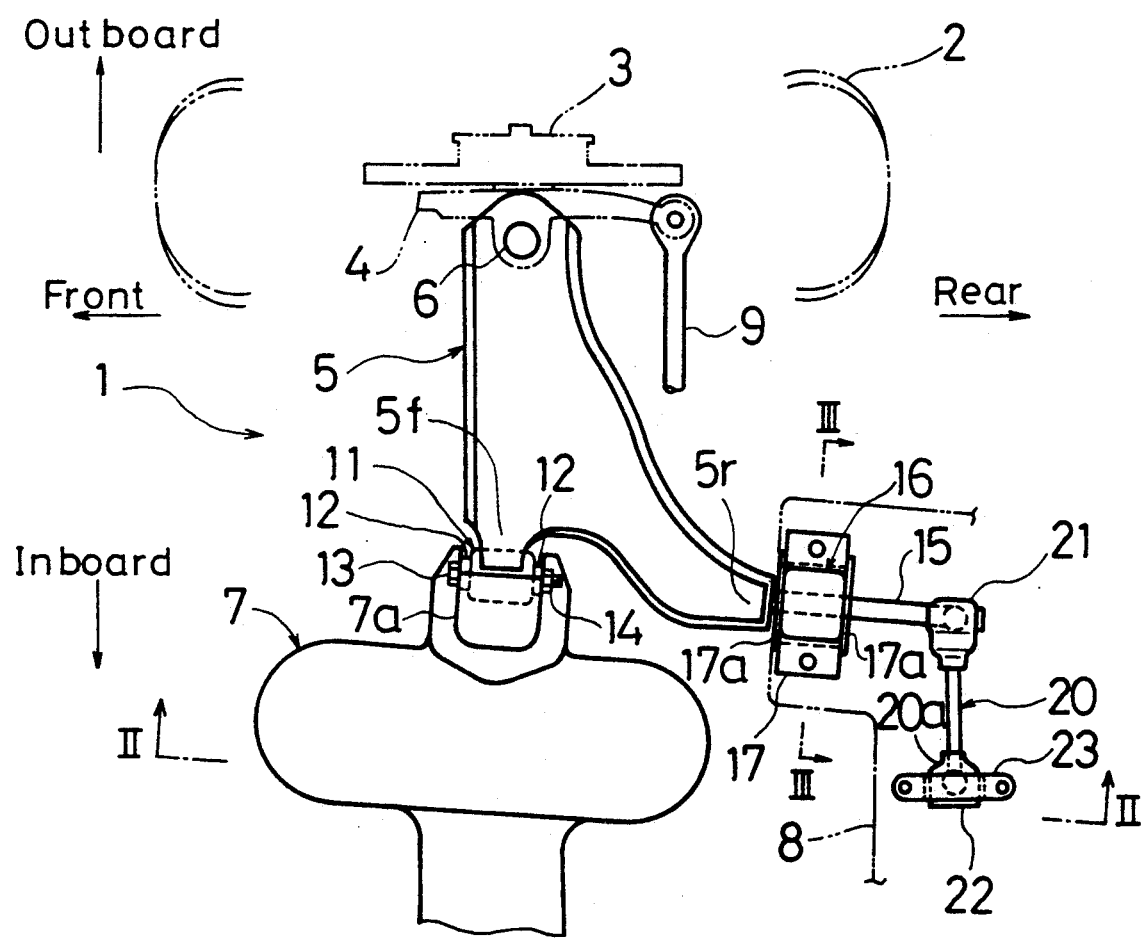
Figure 2:
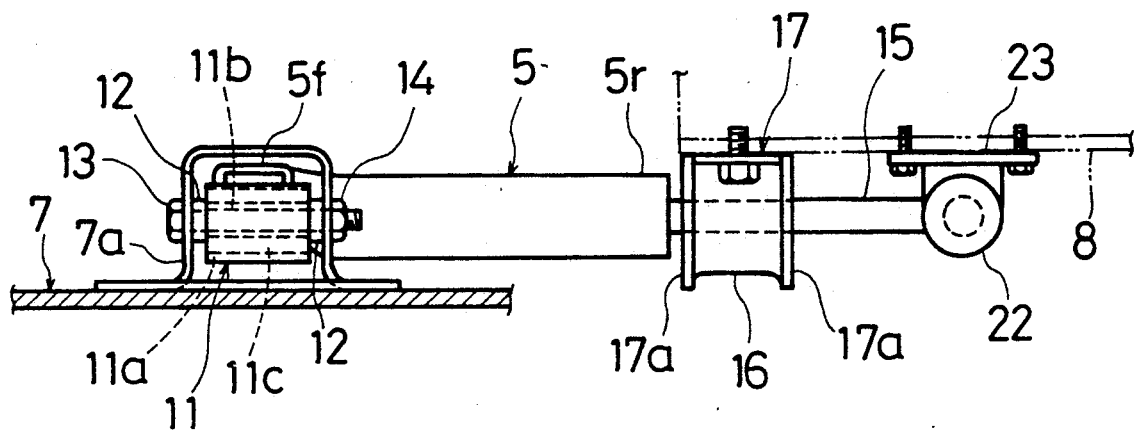
Figure 3:
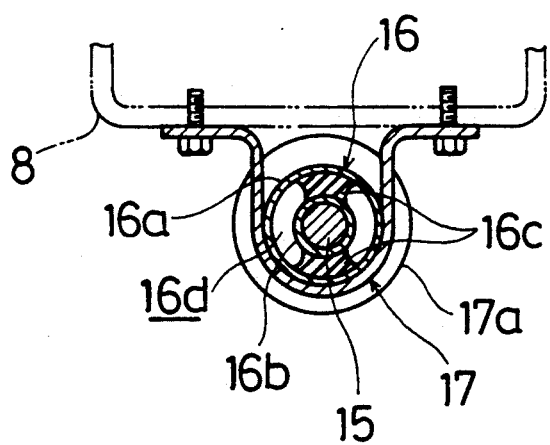

FIGS. 1 through 3 show a right front suspension system for a steerable wheel in accordance with the first embodiment of the present invention. This front suspension system 1 comprises a steering knuckle 4 rotatably supporting a right front wheel 2 through a wheel support 3, and a suspension arm member 5 of a triangular arm member wherein an end portion thereof in the outboard direction (the upper direction in FIG. 1) is attached to a lower end of the steering knuckle 4 through a ball joint 6, while an end portion thereof in the inboard direction (the lower direction in FIG. 1) is extended longitudinally and forked to form a triangular shape. Thus, the suspension arm member 5 includes two supporting portions 5f, 5r. A front supporting portion 5f located inboard of the steering knuckle 4 is extended in the widthwise direction to be attached to a front cross member 7 of a vehicle body side member fixed on the vehicle body. On the other hand, a rear supporting portion 5r located in the rearward direction of the steering knuckle 4 is mounted in the front lower portion of a dash panel (not shown in the drawings) of the vehicle body to be attached to the underside of a frame member 8 of the vehicle body side member extending in the widthwise direction. Although not shown in the drawings, a well-known strut assembly composed of a coil spring or a shock absorber, etc. is disposed in the upper portion of the suspension arm member 5. The upper end and the lower end portions of this strut assembly are fitted respectively at the vehicle body and the upper end of the steering knuckle 4. Interconnected with the rear end portion of this steering knuckle 4 is a tie rod 9 which is in turn connected with a front wheel steering device (not shown in the drawings) for steering the right front wheel 2.

As shown in FIG. 2, a first rubber bushing 11 (a front pivotally mounting member) is welded onto the front supporting portion 5f of the suspension arm member 5. A conventional rubber bushing can be used as this first rubber bushing 11 which is composed of a coaxially disposed thin tubular-type outer cylindrical member 11a and inner cylindrical member 11b, and a rubber member 11c filled therebetween. Spacers 12, 12 are attached in the front and rear of the first rubber bushing 11. A bolt member 13 is inserted inside the inner cylindrical member 11b to tighten a nut member 14. With this arrangement, the front supporting portion 5f is swingably supported in the vertical direction on a supporting portion 7a of the front cross member 7 by means of the first rubber bushing 11. A rubber member 11c of the first rubber bushing 11 is made of relatively hard rubber in order to obtan the transverse rigidity for the front suspension system 1.

Meanwhile, a bar-shaped rod member 15 is provided in the rear supporting portion 5r of the suspension arm member 5. This rod member 15 extends toward the rear of the vehicle body along an axis connecting the front and the rear end portions 5f, 5r of the suspension arm member 5. The rod member 15 is inserted into a second rubber bushing 16 of a pivotally mounting member. As shown in FIG. 3, the second rubber bushing 16, like a conventional rubber bushing is composed of a coaxially disposed outer cylindrical member 16a and inner cylindrical member 16b, and a rubber member 16c filled in a clearance portion 16d formed between the outer cylindrical member 16a and the inner cylindrical member 16b. In this embodiment of the invention, the rubber member 16c is filled only in the upper and lower portions of the clearance portion 16d to leave hollow space in the right and left portions. This is to obtain sufficient longitudinal compliance. Thus, rigidity of the second rubber bushing 16 is set lower.

The second rubber bush 16 is fixed and tightened on the underside of the frame member 8 through a bushing bracket 17 having a flange portion 17a in the front and rear thereof. The rod member 15 is inserted inside the inner cylinder 16b of the second rubber bushing 16. This construction shows that the rear supporting portion 5r of the suspension arm member 5 is supported swingably in the vertical direction to the frame member 8 basically by means of the second rubber bushing 16.

Interposed between the rear end portion of the rod member 15 and a bracket 23 fixed and tightened on the underside of the frame member 8 is an assisting link member 20. This assisting link member 20 is extending in the widthwise direction of the vehicle body and is provided with ball joints 21, 22 of pivotally mounting means on both ends thereof. The rear end portion of the rod member 15 and the bracket 23 of the frame member 8 are interconnected by means of the ball joints 21, 22 on both ends of the assisting link member 20. The assisting link member 20 can rotate in the longitudinal direction on the inner end ball joint 22 thereof as an axis. Therefore, when the longitudinal load is applied on the inboard end portion of the suspension arm member 5, the rear end portion of the rod member 15 can be displaceable in the longitudinal direction so as to permit the longitudinal movement but to restrict the widthwise movement of the suspension arm member 5. In this way, unlike the conventional suspension arm members, the suspension arm member 5 moves in parallel to the longitudinal direction of the vehicle body without rotating.

In the above embodiment, one of the vehicle body side supporting portion 5f, 5r disposed in the longitudinal two positions of the suspension arm member 5, namely, the rear supporting portion 5r located in the rearward position of the steering knuckle 4, is displaceably supported in the longitudinal direction by the assisting link member 20 extending in the widthwise direction of the vehicle body. As a result, sufficient transverse rigidity can be obtained while maintaining the longitudinal compliance on the side of the rear supporting portion 5r. Thus, in the event of longitudinal load imposed on the right front wheel 2, the widthwise displacement of the tie rod 9 due to the rotation of the suspension arm member 5 can be effectively prevented.

In this way, the shimmy phenomenon can be reduced while the longitudinal compliance of the front suspension system 1 can be sufficiently guaranteed. Accordingly, both an improvement of riding comfort and an improvement in handling (steering stability) can be achieved.

Next, the second embodiment of the invention will be described.

Figure 4:
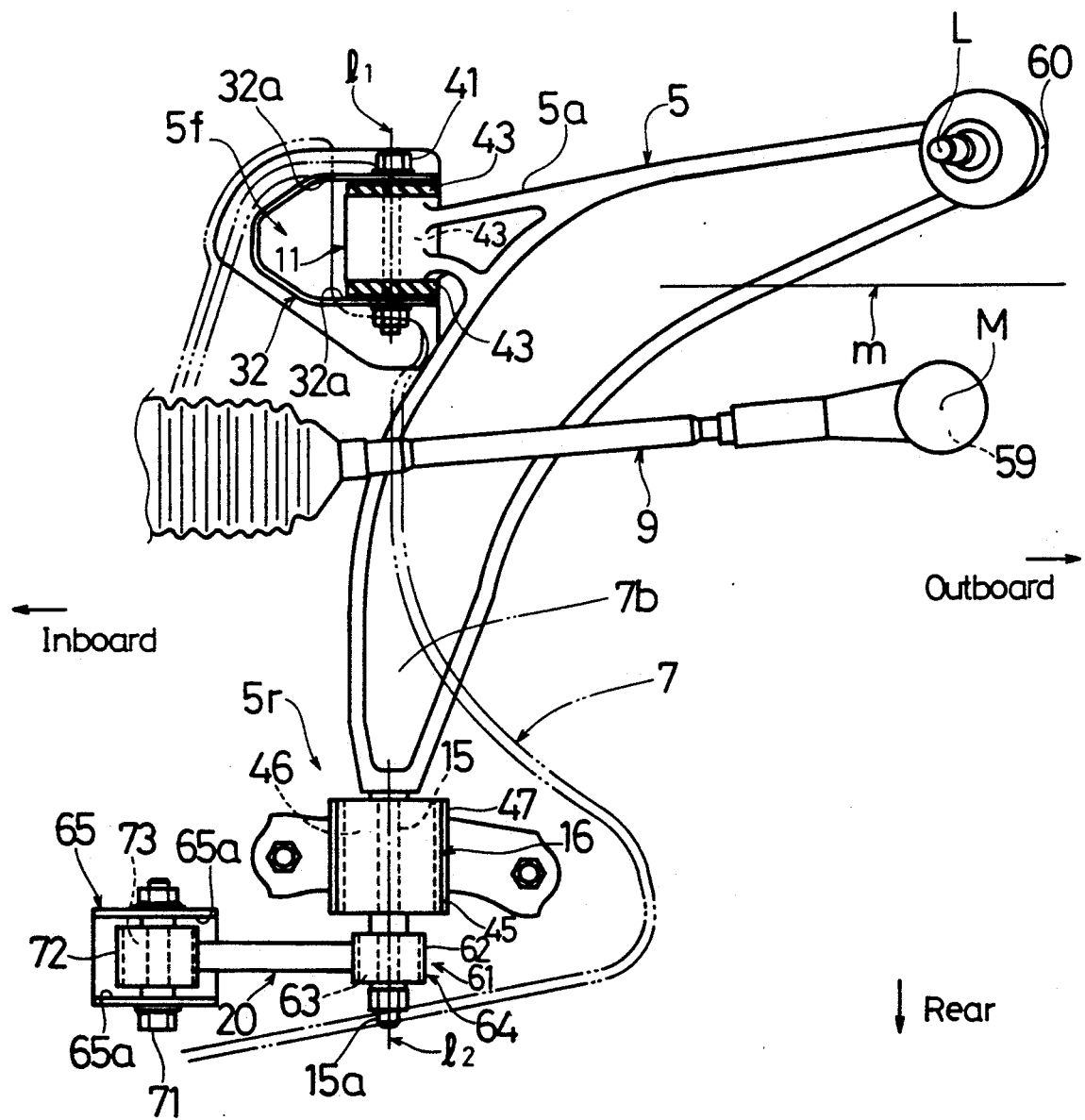
Figure 5:
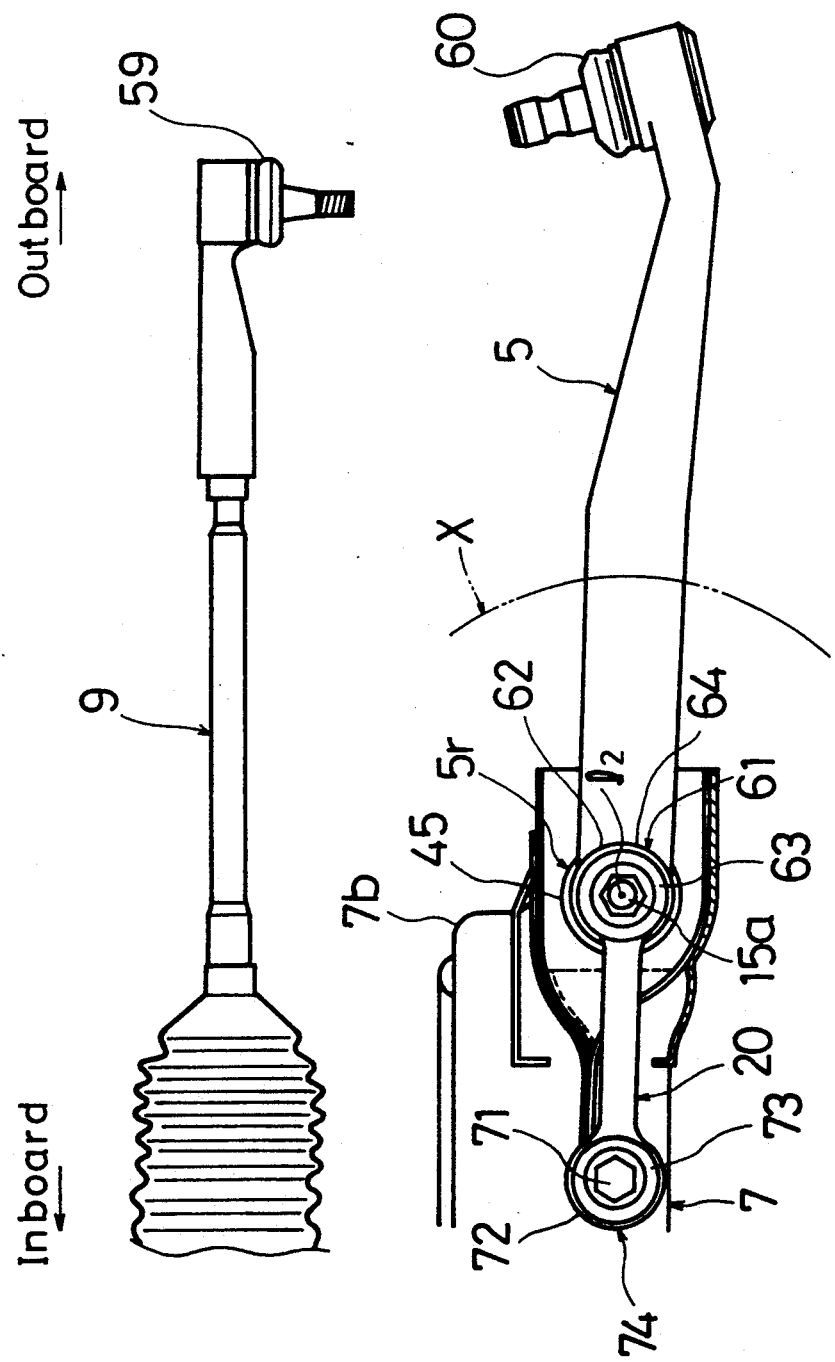
Figure 6:
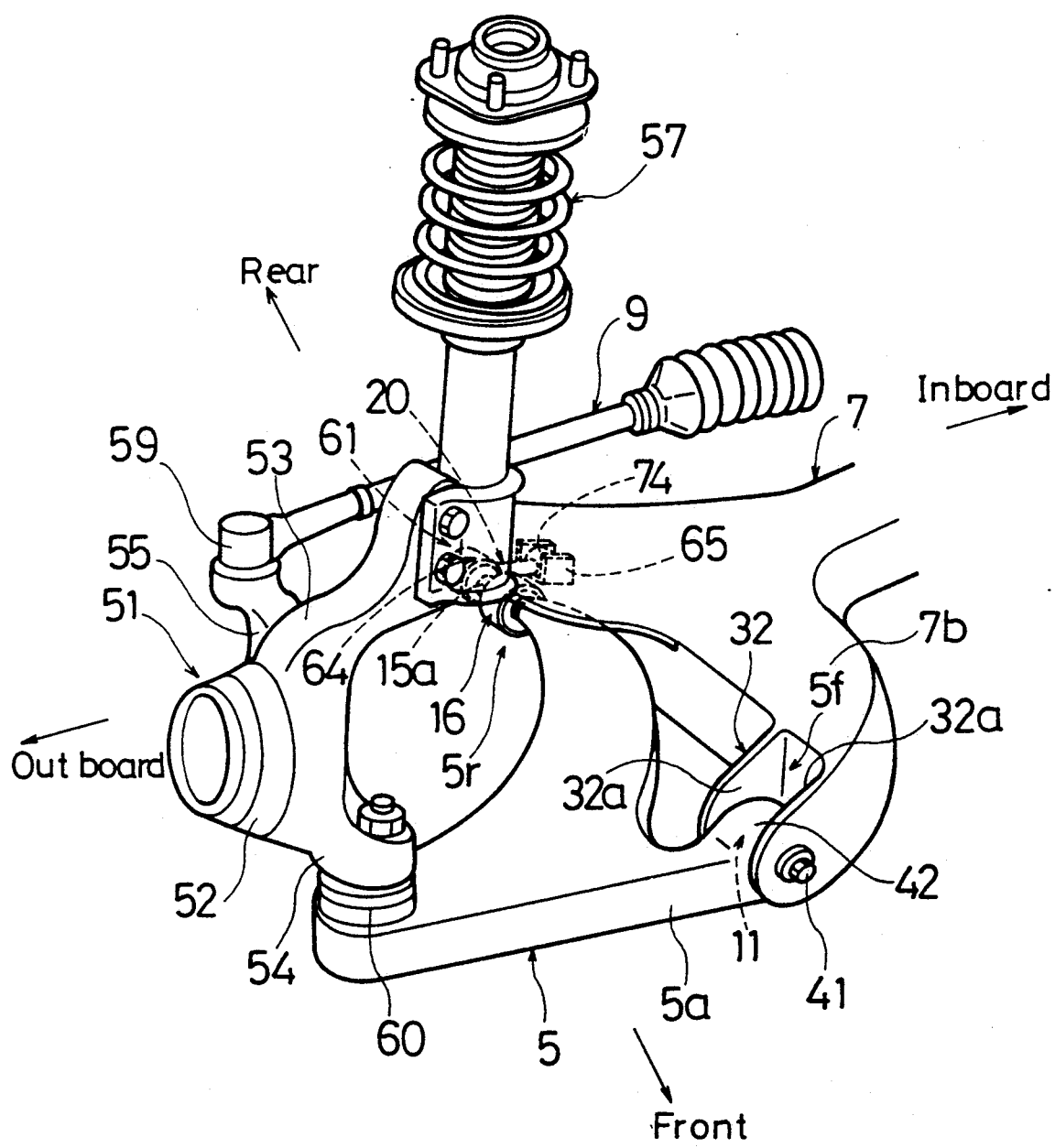

FIGS. 4 through 6 show a front suspension system on the right side of the vehicle. A longitudinally extending extension 7b is provided on a side end portion of a front cross member 7. Provided at a front end portion of the extension 7b is a first bracket 32 having a substantially U-like configuration in cross section. This first bracket 32 opens toward the outboard side (the right side in the drawing) of the vehicle body. Provided on the outboard of the side end portion of the front cross member 7 is a wishbone-type suspension arm member 5 having an arcuate shape. Provided substantially in the intermediate position of the suspension arm member 5 located on the inboard of a wheel supporting member 51 which will be described later is a projected portion 5a projecting outboard of the vehicle body. A front supporting portion 5f is provided at the end portion (an inboard end portion) of the projected portion 5a of the suspension arm member 5 in order to hold this end portion onto the side of the first bracket 32 (the side of the front end portion) of the extension 7b of the front cross member 7. A rear supporting portion 5r is provided at the rear end portion (an inner end portion) of the suspension arm member 5 in order to hold this rear end portion onto the rear end side of the extension 7b of the front cross member 7.

The front supporting portion 5f comprises a first rubber bush 11 which consists of the first bracket 32, a first bolt member 41 (located on an axis $l_1$ of a first bush 43 which will be described later) having an axis $l_1$ (indicated by an alternate long and short dash line in FIG. 4) extending horizontally in the longitudinal direction to pass through opposed surfaces 32a, 32a of the first bracket 32, a first outer cylindrical member 42 located outboard of the first bolt member 41 and provided at the end of the projected portion 5a of the suspension arm member 5, and a first bushing 43 interposed between the first bolt member 41 and the first outer cylindrical member 42. The rear supporting portion 5r comprises a second rubber bushing 16 which consists of a rod member 15 having an axis $l_2$ (indicated by an alternate long and short dash line in FIG. 4) which is common to the axis $l_1$ of the first bolt member 41 and projecting outwardly from a rear end surface of the suspension arm member 5, a second outer cylindrical member 45 provided on the forward outboard position of the rod member 15, a second bushing 46 interposed between the rod member 15 and the second outer cylindrical member 45, and a second bracket 47 fixing the second outer cylindrical member 45 on the underside of the rear end portion of the extension 7b of the front cross member 7. The suspension arm member 5 is swingably supported by the extension 7b of the front cross member 7 at longitudinally spaced-apart two supporting points of the front supporting portion 5f and the rear supporting portion 5r by means of rubber bushing 11, 16.

A wheel supporting member 51 is provided outboard of the suspension arm member 5 in order to support a right front wheel (not shown in the drawing). The wheel supporting member 51 comprises a substantially tubular-shaped wheel support portion 52, an upper extension 53 projecting diagonally upward toward the inboard side from the upper end of the wheel support portion 52, a front extension 54 projecting diagonally forward to the inboard side from the front end of the wheel support portion 52, and a rear extension 55 projecting diagonally rearward to the inboard side from the rear end of the wheel support portion 52. An end portion (an upper end portion) of the upper extension 53 of the wheel supporting member 51 is provided with a coil spring 57 extending substantially in the vertical direction. A lower end portion of the coil spring 57 is tightened by bolts 56, 56. A side end portion of the tie rod 9 is supported on an end portion (a rear end portion) of the rear extension 55 of the wheel support member 51 by means of a pivot-type first joint 59. An outer end portion (a front end portion) of the suspension arm member 5 is supported on an end portion (a front end portion) of the front extension 54 of the wheel supporting member 51 by means of a pivot-type second joint 60. In this case, the second joint 60 serves as a supporting point L between the end portion of the front extension 54 of the wheel supporting member 51 and the outer end portion of the suspension arm member 5. This second joint 60 is in a biased position to the front of a central axis of rotation m (indicated by a thin continuous line in FIG. 4) for the right front wheel. The first joint 59 serves as a supporting point M between the end portion of the rear extension 55 of the wheel supporting member 51 and the side end portion of the tie rod 9. This first joint 59 is in a biased position to the rear of the central axis of rotation m for the right front wheel.

The rod member 15 of the rear supporting portion 5r which is one of the two vehicle body side supporting portions 5f, 5r of the suspension arm member 5 is projecting outwardly from the second bracket 47. A projected end 15a (a rear end portion) of the rod member 15 located on the axis $l_2$ of the second bush 46 is provided with an assisting link member 20. This transversely extending assisting link member 20 is supported rotatably, at the outer end portion thereof, by a suspension arm member side supporting member 61. This suspension arm member side supporting portion 61 comprises a third rubber bushing 64 which consists of a third outer cylindrical member 62 provided outboard of the projected end 15a of the rod member 15 and fixed on the outer end portion of the assisting link member 20, and a third bushing 63 interposed between the projected end 15a of the rod member 15 and the third outer cylindrical member 62. A third bracket 65 having a substantially U-like configuration in cross section opens upwardly at the rear end of the extension 7b of the front cross member 7 located rearward of the rear supporting portion 5r. This third bracket 65 is provided with opposed surfaces 65a, 65a longitudinally facing each other.

Figure 7:
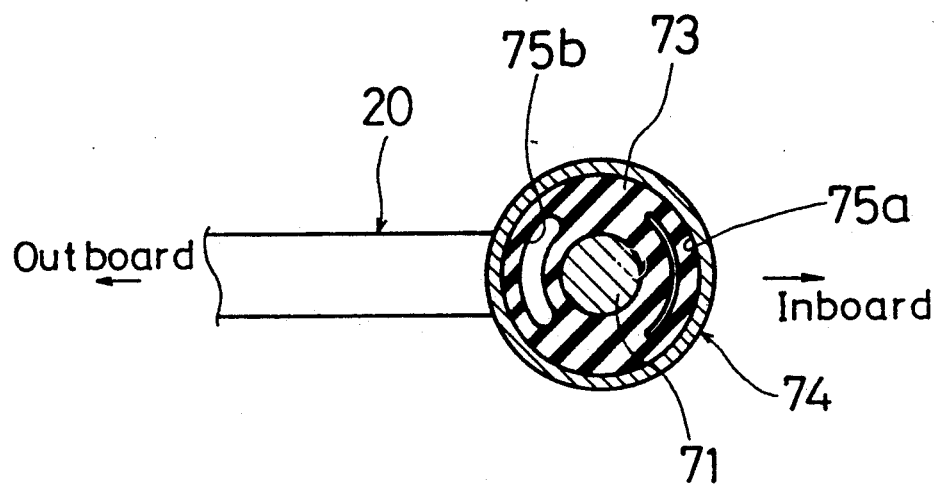
Figure 8:
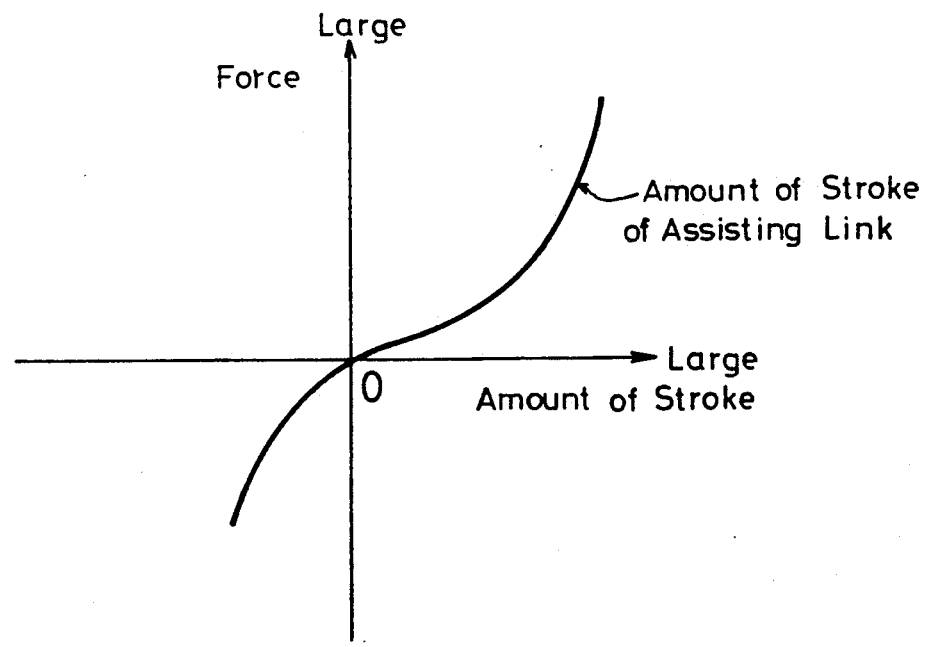
Figure 9:
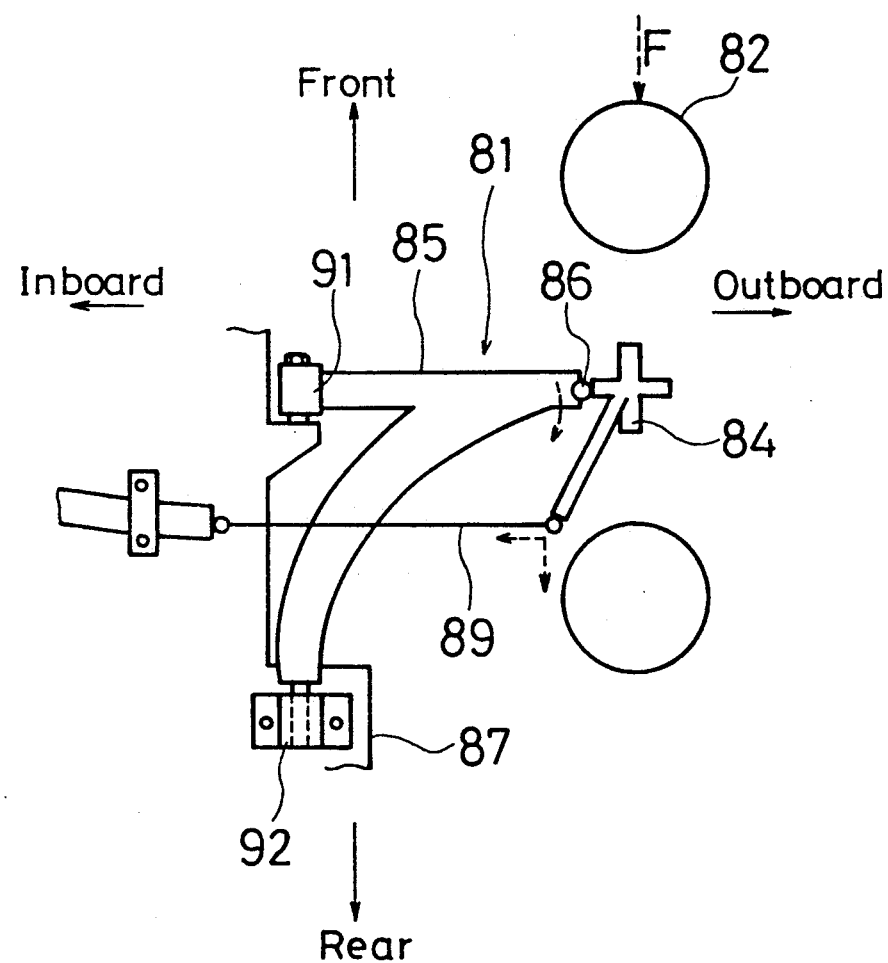
FIG. 9 (Prior Art) is a plane explanatory drawing showing a front suspension device known in the prior art.

As shown in FIG. 7, an inner end portion of the assisting link member 20 is supported on the rear end of the extension 7b of the front cross member 7 by a fourth rubber bushing 74 through the third bracket 65. This fourth rubber bushing 74 consists of a tightening bolt 71 passing through the opposed faces 65a, 65a of the third bracket 65, a fourth outer cylindrical member 72 provided outboard of the tightening bolt 71 and fixed on an inner end portion of the assisting link member 20, and an elastic bushing 73 interposed between the tightening bolt 71 and the fourth outer cylindrical member 72. Provided inside the elastic bushing 73 are hollow inside cavity 75a and outside cavity 75b which are facing inboard and outboard to be opposed each other with the tightening bolt 71 therebetween. The outside cavity 75b has larger width than the inside cavity 75a. Thus, as shown in FIG. 8, the elastic bushing 73 of the assisting link 20 is designed to transform from the soft state to the rigid state when external force acts on the suspension arm member 5 from the front of the vehicle body. More specifically, when external force acts on from the front, the suspension arm member 5 rotates rearwardly (clockwise rotation in FIG. 4) on the axis $l_1$, $l_2$, respectively of the rubber bushing 11 of the front supporting portion 5f and the rubber bushing 16 of the rear supporting portion 5r. The elastic bushing 73 of the assisting link member 20 transforms while showing non-linear elastic characteristic along with the movement (displacement in the transverse direction of the vehicle body) of the projected end 15a of the rod member 15 which is pushed inboard of the vehicle body. This transformation starts from a state when the elastic bushing 73 is easily transformed due to the hollow outside cavity 75b, and ends in a state when the elastic bushing 73 cannot be easily transformed due to closed inside cavity 75a and outside cavity 75b.

In FIG. 5, X designates a swing path of the suspension arm member 5 in the vertical direction.

As described in the above embodiment, even when the turning operation etc. of the vehicle generates external force and this external force acts on the vehicle from the transverse direction of the vehicle body, the vehicle is jointly supported by the transversely extending assisting link 20 and the suspension arm member 5 having an improved rigidity against this external force. Transverse rigidity and strength has been improved in this suspension arm member 5 because of hardness of rubber bushes 11, 16 themselves, respectively of the front supporting portion 5f and the rear supporting portion 5r of the suspension arm member 5. In this way, steering stability becomes favorable at the time of the vehicle turning operation.

In this case, when external force acts on the suspension arm member 5 from the front of the vehicle body, hardness of the assisting link 20 changes from a soft state to a hard state due to the elastic bushing 73 of the fourth rubber bushing 74. More specifically, when force from the front of the vehicle body acts on the suspension arm member 5 and causes rearward rotation thereof on axes $l_1$, $l_2$ respectively of the rubber bush 11 of the front supporting portion 5f and the rubber bushing 16 of the rear supporting portion 5r, the elastic bushing 73 of the assisting link member 20 is pushed inboard and transforms from an easily transformable state due to the hollow outside cavity 75b to an untransformable state due to closed inside cavity 75a and outside cavity 75b.

With the above-mentioned construction, when external force from the front of the vehicle body acts on the suspension arm member 5 in the case where the vehicle is running on a rough road surface, and the suspension arm member 5 starts rotating on the axes of $l_1$, $l_2$, respectively of the front supporting portion 5f and the rear supporting portion 5r of the suspension arm member 5, the outside cavity 75b of the elastic bushing 73 immediately shrinks due to the elasticity of the elastic bushing 73 of the fourth rubber bush 74 of the assisting link member 20. Accordingly, sufficient compliance can be obtained without restricting the longitudinal movement of the suspension are member 5. Then, when the suspension arm member 5 rotates to some extent, the inside cavity 75a and the outside cavity 75b of the elastic bushing 73 are closed to be a state where the elastic bushing 73 gradually becomes hard and cannot be easily transformed. Thus, the rotation of the suspension arm member 5 is effectively restricted. As a result, without impairing steering stability in case of turning operation, riding comfort when the vehicle runs on a rough road surface can be remarkably improved.

It is to be understood that the invention is not limited to the aforementioned embodiments and that various changes and modifications may be made without departing from the scope and spirit of the invention. For example, although the elastic bushing 73 was provided in the fourth rubber bushing 74 of the assisting link 20 in the above embodiments, the elastic bushing 73 can be provided in the suspension arm member side supporting portion of the asisting link member, or in the suspension arm member side supporting portion of the assisting link member and the vehicle body side supporting portion.

The wheel side supporting point L of the suspension arm member 5 was in a biased position to the front of the central axis of rotation m of the front wheel in the aforementioned embodiment. However, the supporting point (the first joint) between the wheel supporting member and the side end of portion of the tie rod can be in a biased position to the front of the central axis of rotation of the right front wheel, and the wheel side supporting point of the suspension arm member can be in the rear of the rotational center of the wheel.

The assisting link member 20 was provided in a double-wishbone-type or wishbone type suspension arm member 5 in the above embodiments. However, the invention is applicable to a strut-type suspension. Furthermore, although the invention was applied to a right front wheel of a vehicle, namely, a front suspension, in the aforementioned embodiments, the invention can be applied to a rear suspension where rear wheels are steerable.

Another alternate example is that he elastic bushing in the above embodiments can be designed to have a softer elastic characteristic in case when the projected end of the rod member undergoes displacement from a neutral position, in which the projected end of the rod member shows no displacement, to the inboard side than an elastic characteristic in case when the projected end of the rod member undergoes displacement from the neutral position to the outboard side of vehicle body.

What is claimed is:

1. A vehicle suspension system for a steerable wheel including a triangular arm member wherein a vehicle body outboard end thereof is interconnected with a wheel support member rotatably supporting a steerable wheel, and a vehicle body inboard end is supported by a vehicle body side member by means of two pivotally mounted members longitudinally spaced apart at a fixed interval; wherein a front pivotally mounting member located in the front of the vehicle body out of said two pivotally mounting members is arranged substantially sideways from said wheel support member, while a rear pivotally mounting member located in the rear of the vehicle body out of said two pivotally mounting members is made of a rubber bushing which is displaceable at least in the transverse direction of the vehicle body; and said triangular arm member supports said wheel swingably in the vertical direction, said vehicle suspension system for a steerable wheel further comprising:

an assisting link member extending substantially in the transverse direction of the vehicle body and having rotatable pivotally mounting means on both ends thereof, wherein pivotally mounting means on one end is interconnected with a rear end portion of said triangular arm member, and pivotally mounting means on the other end is interconnected with said vehicle body side member, said assisting link member interconnecting said rear end portion of said triangular arm member and said vehicle body side member so as to allow a movement of said rear end portion of said triangular arm member in the longitudinal direction of the vehcile body, but to restrict a movement thereof in the transverse direction of the vehicle body;

said rubber bush of said rear pivotally mounting member having an axis extending in the longitudinal direction of the vehicle body; and a rod member, extending rearwardly on said axis of said rubber bush, provided at a rear portion of said triangular arm member, and wherein an outboard end of said assisting link is connected with a rear end portion of said rod member.

2. A vehicle suspension system for a steerable wheel including a triangular arm member having a vehicle body outboard end interconnected with a wheel support member rotatably supporting a steerable wheel end and a vehicle body inboard end supported by a vehicle body side member for pivoting movement along an axis extending longitudinally of an associated vehicle by means of front and rear pivotally mounting members longitudinally spaced apart at a fixed interval; said front pivotally mounting member being located in the front of the vehicle body and arranged substantially sideways from said wheel support member; said rear pivotally mounting member being located in the rear of the vehicle body and including a rubber bushing which is displaceable at least in the transverse direction of the vehicle body; said triangular arm member supporting said wheel swingably in the vertical direction; said vehicle suspension system for a steerable wheel further comprising:

said triangular arm member having a rear end portion extending longitudinally along said axis; and an assisting link member extending substantially in the transverse direction of the vehicle body and having rotatable pivotally mounting means on both ends thereof, wherein said pivotally mounting means on one end is interconnected with said rear end portion of said triangular arm member and is arranged on a pivot line of said triangular arm member, and said pivotally mounting means on the other end is interconnected with said vehicle body side member, said assisting link member interconnecting said rear end portion of said triangular arm member and said vehicle body side member so as to allow a movement of said rear end portion of said triangular arm member in the longitudinal direction of the vehicle body, but to restrict movement of said triangular arm member in the transverse direction of the vehicle body.

3. A suspension system for a steerable wheel as defined in claim 2 wherein said rubber bushing of said rear pivotally mounting member is provided with an axis extending in the longitudinal direction of the vehicle body, and wherein a rod member extending rearwardly on said axis of said rubber bush is provided at a rear portion of said triangular arm member, and wherein an outboard end of said assisting link is connected with a rear end portion of said rod member.

4. A vehicle suspension system for a steerable wheel as defined in claim 3 wherein said rubber bushing is provided with an inner cylindrical portion, and wherein said rod member extends rearwardly, passing through said inner cylindrical portion of said rubber bushing of said rear pivotally mounting member.

5. A vehicle suspension system for a steerable wheel as defined in claim 4 wherein said pivotally mounting means of said assisting link member are provided with ball joint means.

6. A vehicle suspension system for a steerable wheel as defined in claim 4 wherein at least one pivotal mounting means of said assisting link member is provided with an elastic bushing.

7. A vehicle suspension system for a steerable wheel as defined in claim 6 wherein said elastic bushing has a fixed elastic characteristic against a transverse displacement of said rear end portion of said rod member of said triangular arm member.

8. A vehicle suspension system for a steerable wheel as defined in claim 7 wherein said elastic characteristic of siad elastic bushing is such a non-linear type characteristic that said elastic bushing becomes soft in a region where said transverse displacement of said rear end portion of said rod member of said triangular are member is small, and becomes hard in a region where said transverse displacement of said rear end portion of said rod member of said triangular arm member is large.

9. A vehicle suspension system for a steerable wheel as defined in claim 8 wherein said elastic bushing is provided with a clearance so that said elastic bush can show a non-linear elastic characteristic in accordance with said transverse displacement of said rear end portion of said rod member of said triangular arm member.

10. A vehicle suspension system for as steerable wheel as defined in claim 7 wherein said elastic bushing is designed to have a softer elastic characteristic in case when said rear end portion of said rod member undergoes displacement from a neutral position, in which rear end portion of said rod member shows no displacement, to an inboard side of the vehicle body than an elastic characteristic in case when said rear end portion of said rod member undergoes displacement from said neutral position to an outboard side of the vehicle body.

11. A vehicle suspension system for a steerable wheel including a triangular arm member having a vehicle body outboard end interconnected with a wheel support member rotatably supporting a steerable wheel and a vehicle body inboard end supported by a vehicle body side member by means of front and rear pivotally mounting members longitudinally spaced apart at a fixed interval; said front pivotally mounting member being located in the front of the vehicle body and arranged substantially sideways from said wheel support member; said rear pivotally mounting member being located in the rear of the vehicle body and including a rubber bushing which is displaceable at least in the transverse direction of the vehicle body; said triangular arm member supporting said wheel swingably in the vertical direction; said vehicle suspension system for a steerable wheel further comprising:

an assisting link member extending substantially in the transverse direction of the vehicle body and having rotatable pivotally mounting means on both ends thereof, wherein said pivotally mounting means on one end is interconnected with a rear end portion of said triangular arm member and is arranged on a pivot line of said triangular arm member, said pivotally mounting means on the other end is interconnected with said vehicle body side member, said assisting link member interconnecting said rear end portion of said triangular arm member and said vehicle body side member so as to allow a movement of said rear end portion of said triangular arm member in the longitudinal direction of the vehicle body, but to restrict movement of said triangular arm member in the transverse direction of the vehicle body;

said rubber bushing of said rear pivotally mounting member having an axis extending longitudinally of said vehicle body; and said triangular arm member including a rod member extending rearwardly from a rear portion thereof along said axis and being received by said bush, a rear end portion of said rod member being connected to an outboard end of said assisting link.

* * * * *